CATHODE RAY BEAM INTENSITY CONTROL
Filed Jan. 7, 1946
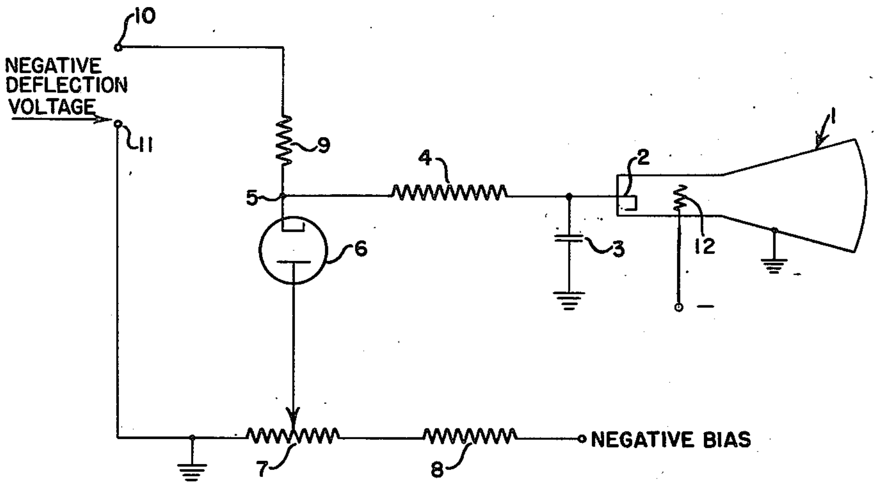
INVENTOR
ROBERT M. SILLIMAN
BY
William D. Hall.
ATTORNEY Patented Sept. 11, 1951 2,567,861

UNITED STATES PATENT OFFICE 2,567,861

CATHODE-RAY BEAM INTENSITY CONTROL

Robert M. Silliman, Silver Spring, Md., assignor to the United States of America as represented by the Secretary of War Application January 7, 1946, Serial No. 639,649

3 Claims. (Cl. 315—22)

The invention relates to cathode ray tubes in general and in particular to an electrical circuit for controlling the intensity of the electron beam in accordance with the amount of deflection of the beam.

In cathode ray oscilloscopes it is usually necessary for the operator to control manually the intensity of the electron beam in order to have the beam sufficiently bright to produce a trace which can be readily seen and at the same time avoid burning the screen when no deflection voltage is applied to the cathode ray tube. In most instances, the beam is turned up to a sufficient intensity to enable the trace to be seen and the operator fails to reduce the intensity when necessary, thereby burning the screen and causing the tube to be discarded sooner than necessary.

It is accordingly an object of this invention to devise a circuit which will control the intensity of the electron beam in accordance with the amount of beam deflection.

It is a further object of this invention to devise a circuit which will reduce the intensity of the electron beam during zero or low deflection signal periods and increase the intensity of the beam during periods of large deflection signal.

Other objects and advantages will become readily apparent by referring to the hereinafter described specification.

The cathode of a cathode ray tube is connected to a capacitor and to a resistance network in such a way that, when a negative sweep signal is applied to the network, the potential on the cathode becomes more negative thus resulting in increasing the intensity of the electron beam. This negative sweep signal is the one applied to the deflecting plates of the tubes or is proportional thereto. During the periods when no signal is received at the terminals of the network, the potential on the cathode becomes less negative thereby reducing the intensity of the beam and preventing the screen from being burned.

The invention will be best understood by referring to the single figure of the drawing which shows a preferred embodiment of the circuit.

In the figure a cathode ray tube 1 has its cathode 2 connected to ground through a capacitor 3. The cathode is also connected through a resistor 4 to point 5. Point 5 is connected to the cathode of diode 6; the anode of diode 6 is connected to a voltage divider consisting of potentiometer 7 and resistor 8 connected in series between a source of negative bias and ground. The bias on the anode of the diode can be adjusted by means of the movable contact of the potentiometer 7. Point 5 is also connected, through resistor 9, to a source of negative signal voltage which is applied between terminals 10 and 11. Grid 12 is connected to a point of negative potential.

When a negative sweep signal is applied to terminal 10, the potential at the cathode 2 becomes more negative and capacitor 3 acquires a negative charge. The cathode will continue to acquire a negative potential until the potential at point 5 is slightly more negative than the potential on the anode of tube 6. When this occurs the diode will conduct and prevent any further increase in negative potential from taking place at the cathode of the cathode ray tube. If it is assumed that the potential on the grid remains constant, it can be readily seen that the electron beam intensity will increase as the cathode becomes more negative. The potentiometer 7 may therefore be used to adjust the maximum intensity of the electron beam. The minimum intensity may be adjusted by the conventional intensity controls. The value of resistor 9 determines the amount of signal voltage required to obtain maximum intensity of the electron beam. It has been found, for best operation, that the value of resistor 9 should be approximately equal to the sum of the resistances of potentiometer 7 and resistor 8. An important factor in the circuit is the time constant for the charge and discharge of capacitor 3. The value of this time constant is not critical however. If the time constant is too short, the intensity of the beam will vary during a single sweep. This is, of course, undesirable. On the other hand, if the time constant is too long, the intensity of the beam will remain too high for a short time after the signal voltage is no longer applied to the cathode ray tube. This period would normally be quite small and would not be sufficiently long to damage the screen.

It will be apparent that there may be deviations from the invention as described which still fall fairly within the spirit and scope of the invention. For example, the potental on the grid of the cathode ray tube could be made more positive with increasing deflection signals.

Accordingly I claim all such deviations which fall fairly within the spirit and scope of the invention as identified in the hereinafter appended claims.

What is claimed is:

1. In a cathode ray oscilloscope, a cathode ray tube having a cathode and a grid, a point of reference potential, a capacitor connecting the cathode of said cathode ray tube to said point of reference potential, a source of negative potential, a vacuum tube having a cathode and an anode, a potentiometer having a first terminal connected to said point of reference potential, a second terminal electrically connected to said source of negative potential and the movable contact electrically connected to the anode of said vacuum tube, resistor means electrically connecting the cathode of said cathode ray tube to the cathode of said vacuum tube and means including a resistor for applying a negative sweep signal to the cathode of said vacuum tube whereby the potential on the cathode of the cathode ray tube will be controlled by said sweep voltage.

2. In a cathode ray oscilloscope, a cathode ray tube having a cathode and a grid, a point of reference potential, a capacitor connecting the cathode of said cathode ray tube to said point of reference potential, a vacuum tube having a cathode and an anode, a source of adjustable negative bias, means electrically connecting the anode of said vacuum tube to said source of negative bias, resistor means electrically connecting the cathode of said cathode ray tube to the cathode of said vacuum tube and means for applying a negative sweep voltage signal to the cathode of said vacuum tube.

3. In a cathode ray oscilloscope, a cathode ray tube having a cathode and a grid, a point of reference potential, a capacitor connecting the cathode of said cathode ray tube to said point of reference potential, a resistor having a first terminal and a second terminal, means connecting said first terminal to the cathode of said cathode ray tube and means for applying a negative sweep voltage signal to the second terminal of said resistor.

ROBERT M. SILLIMAN.

REFERENCES CITED

The following references are of record in the file of this patent:

UNITED STATES PATENTS

| Number | Name | Date |
|---|---|---|
| 2,226,996 | Schlesinger | Dec. 31, 1940 |
| 2,227,036 | Schlesinger | Dec. 31, 1940 |
| 2,261,645 | Delvaux | Nov. 4, 1941 |
| 2,343,988 | Mahoney, Jr. | Mar. 14, 1944 |
| 2,399,754 | Miller | May 7, 1946 |
| 2,415,870 | De Ryder | Feb. 18, 1947 |
| 2,418,133 | Miller et al. | Apr. 1, 1947 |